United States Patent [19]

Vermoortele et al.

[11] Patent Number: 5,693,136
[45] Date of Patent: Dec. 2, 1997

[54] BISMUTH VANADATE PIGMENTS AND PROCESSES FOR PRODUCING THE SAME

[75] Inventors: Frank Vermoortele, Marcq-en-Baroeul, France; Emile Joseph Buyse, Mouseron, Belgium

[73] Assignee: Colour Research Company (CORECO) Ltd., Dublin, Ireland

[21] Appl. No.: 373,212

[22] PCT Filed: Jul. 8, 1993

[86] PCT No.: PCT/BE93/00047

§ 371 Date: Jan. 17, 1995

§ 102(e) Date: Jan. 17, 1995

[87] PCT Pub. No.: WO94/01497

PCT Pub. Date: Jan. 20, 1994

[30] Foreign Application Priority Data

Feb. 14, 1992 [BE] Belgium .................... 9200653

[51] Int. Cl.$^6$ .................................................. C09C 1/00
[52] U.S. Cl. .................. 106/479; 106/401; 423/593; 423/617; 428/403
[58] Field of Search ....................... 106/401, 479, 106/903; 423/593, 617; 428/403

[56] References Cited

U.S. PATENT DOCUMENTS

| | | | |
|---|---|---|---|
| 4,026,722 | 5/1977 | Hess | 106/479 |
| 4,063,956 | 12/1977 | Higgins | 106/479 |
| 4,115,141 | 9/1978 | Piltingsrud | 106/479 |
| 4,115,142 | 9/1978 | Hess | 106/479 |
| 4,272,296 | 6/1981 | Balducci et al. | 106/479 |
| 4,316,746 | 2/1982 | Rustioni et al. | 106/479 |
| 4,455,174 | 6/1984 | Wienand et al. | 106/479 |
| 4,752,460 | 6/1988 | Herren | 106/479 |
| 4,851,049 | 7/1989 | Wienand et al. | 106/479 |
| 5,186,748 | 2/1993 | Erkens et al. | 106/479 |

FOREIGN PATENT DOCUMENTS

| | | |
|---|---|---|
| 74-049 | 3/1983 | European Pat. Off. |
| 63-61080 | 3/1988 | Japan . |

*Primary Examiner*—Michael Marcheschi
*Attorney, Agent, or Firm*—Kolisch, Hartwell, Dickinson, McCormack & Heuser

[57] ABSTRACT

A process for preparing a pigment based on bismuth vanadate by reacting an acidic solution of bismuth nitrate with a basic solution of ammonium metavanadate to form a precipitate in a very acidic reaction mixture with a pH value of between 1 and 2. The pH of the reaction mixture is brought to a value of about 7, and the temperature of the reaction mixture is established at 80° C. or higher for a period of about 30 minutes. The reaction mixture is stirred for a period of time of at least one half hour until a pH of approximately 6.5 is reached, and then the precipitate is filtered from the reaction mixture. Finally, the precipitate is washed and dried to obtain a dried pigment.

10 Claims, No Drawings

BISMUTH VANADATE PIGMENTS AND PROCESSES FOR PRODUCING THE SAME

CROSS-REFERENCE TO RELATED APPLICATIONS

This application claims the benefit under 37 USC §371 of International Patent Application PCT/BE93/00047, international filing date Jul. 8, 1993.

SUBJECT OF THE INVENTION

The present invention relates to a process for the preparation of pigments based on bismuth vanadate exhibiting a purity of hue and a depth of color which are improved. The invention also relates to the products obtained by this process and to their application for the coloring of paints, of lacquers and/or of plastics.

Pure or modified bismuth vanadates are well-known chemical compounds. They can be employed inter alia as a catalyst for obtaining olefins, as a reversible temperature indicator or as a nontoxic yellow pigment for the coloring of paints and of plastics (patent applications GB 237 688—U.S. Pat. No. 3,843,554—JP 6361080—DE 2727863).

Various processes make it possible to manufacture pigments based on bismuth vanadate. It thus is possible to calcine mixtures of oxides or of any salt which decomposes thermally into oxide, for example, nitrate, carbonate, hydroxide, phosphate, etc. (U.S. Pat. Nos. 4,026,722—4,251,283). The calcination temperatures may vary within a wide range of values (200° to more than 1000° C.). The calcined products can be purified by milling in an alkaline medium (patent EP 304399).

It also is possible to mix solutions containing salts of bismuth, vanadium and the like and to calcine the products thus obtained (patent applications BE 9001230—DE 3135281). When starting with finely divided metallic bismuth, the presence of flux may be advantageous (patent application DE 3315850).

It also is possible to carry out the precipitation of a bismuth vanadate gel which is separated from the reaction mixture, which is washed to remove the nitrates and which is then aged without going through an actual calcination stage (patent application U.S. Pat. No. 4,752,460—EP 430888—U.S. Pat. No. 4,063,956).

These processes make it possible to obtain pigments based on bismuth vanadate with a fairly pure yellow hue and whose fastness to light and to heat can be improved by various coating and stabilizing treatments. However, the hue purity and brilliance, the depth of color and the hiding power of these pigments remain limited and restrict their use.

Patent FR-2355779 describes a process for the preparation of a bismuth vanadate, in which a solution of bismuth nitrate in nitric acid is mixed with a solution of alkali metal vanadate (preferably a sodium or potassium vanadate) in an aqueous base chosen from sodium hydroxide and potassium hydroxide, to precipitate a bismuth vanadate gel in suspension in a solution containing a dissolved alkali metal nitrate: the normalities of the acidic and basic solutions being adjusted before the mixing operation so that the pH of the mixture is approximately between 1.0 and 11.0.

The alkali metal vanadate solution is prepared by dissolving a pentavalent vanadium compound such as $V_2O_5$, $Na_3VO_4$, $Na_4V_2O_7$, $Na_4V_2O_7$ or $K_3VO_4$ in an aqueous base chosen from sodium hydroxide and potassium hydroxide.

However, this salt has the disadvantage of being poorly soluble and of giving colored mother liquors of soluble salts based on pentavalent vanadium.

Furthermore, dissolving vanadium pentoxide in caustic soda to obtain a basic solution of sodium vanadate is not a very easy operation because stirring must be continued for a very long time at a temperature which is higher than normal and preferably with pure or distilled water.

In this process, the mixing of bismuth and vanadate solution is performed by "incremental combination," which consists in the simultaneous addition of the reactants under pressure into a mixing tee.

This technique prevents the relatively high gradients and the stoichiometric imbalance which are produced when large quantities of reacting substances are mixed all at once. This imbalance results in undesirable secondary reactions. Equipment which conveniently yields this result is T mixers or flow reactors.

However, this mixing technique does not make it possible to obtain pigments of sufficiently brilliant hue and of sufficient depth of color.

CHARACTERISTIC ELEMENTS OF THE INVENTION

The invention relates to a process for the preparation of a pigment based on bismuth vanadate, preferably of very brilliant and pure yellow hue, very opaque, and whose depth of coloring is increased by 50%. The general chemical formula of such pigments is preferably the following:

$Bi_aL_bM_cN_dO_4$, in which:

L is Si or simultaneously Si and one or more elements chosen from Ti, Ge or Zr, or else simultaneously Si or one or more elements chosen from Ti, Ge or Zr and one or more elements of group IIIa.

M is V, or simultaneously V and/or a number of elements chosen from group V.

N is Mo or W.

a varies from 1 to 4/3.

b and d varying from 0 to 1 max.

c being greater than zero and smaller than or equal to 1.

According to the invention the following operating stages are carded out:

a) an acidic solution of bismuth nitrate is reacted with a basic solution of ammonium metavanadate and optionally of other salts to form a precipitate based on bismuth vanadate in a very acidic reaction medium at a pH generally between 1 and 2. This mixing preferably is performed by adding one solution to another, that is to say in a high concentration gradient, which makes it possible to have a complete reaction and which avoids rejection of the soluble salts. In fact, in contrast to the process of the state of the art, the gel is not separated from the suspension and solutions which are colored by soluble vanadium salts are not rejected during the filtration and washing.

b) the pH of the reaction mixture of stage a) is brought to a value of about 7, preferably directly to a steady value of 7, by adding a base (for example caustic soda, caustic potash, aqueous ammonia, etc.).

c) the temperature is raised to a value of at least 80° C. over a period of time of about 30 minutes while the pH is maintained at a value of 7 with a base.

d) stirring is carried out for ½ to more than 2 hours until a pH of approximately 6.5 is reached.

e) the pigment is filtered off, is wafted carefully with water and is dried, preferably at a temperature higher than 300° C. (for example in a sprayer). Advantageously the pigment is coated to improve further its resistance to light, to inclement weather and to heat, by virtue of inorganic and/or organic coatings and surface treatments.

The invention also relates to the pigment obtained by this process and to its use for the coloring of pits, of lacquers, and/or of plastics.

The invention will be described in greater detail in the following comparative examples which are given solely by way of illustration of the invention.

EXAMPLE 1

18 g of bismuth nitrate (acidic solution containing 22.6 of $Bi[(NO_3)_3]$) are poured into a one-liter reactor. The volume is adjusted to 100 ml by adding water and a basic solution containing 5.3 g of ammonium metavanadate, whose volume has been made up to 250 ml by adding water, is added over 45 minutes. The pH is then raised to 7 by adding a caustic soda solution. The temperature is then raised to 80° C. over 30 minutes. Stirring is carded out for ½ hour while the temperature and the pH are maintained (t=80° C., pH=7).

When the pH begins to rise slightly (pH=7.1) stirring is continued for another 30 minutes. Finally, after filtration, washing, drying and milling, a pigment powder with a very brilliant yellow and with a very great depth of color is obtained.

EXAMPLE 2

According to the method described in Example 1, preparations are performed with the following variants:

a) the pH is adjusted to 6.5 instead of 7.

b) the pH is adjusted to 7.5 instead of 7.

c) the temperature is adjusted to 95° C. instead of 80° C.

d) just after the precipitation the pH is adjusted to 4.5, the precipitate is filtered off, is washed and is resuspended in 500 ml of water and then the pH is adjusted to 7 and the continuation is as in Example 1.

e) the temperature is adjusted to 70° C. instead of 80° C.

The pigments obtained according to examples a), b), d), and e) are inferior to the pigment of Example 1: dirtier and less brilliant hue, lower depth of color, lower resistance to light, on the other hand, the pigment of Example 2c) is similar to the pigment of Example 1.

This shows:

1st that a pH higher or lower than 7 gives bad results.

2nd that washing the precipitate before the maturing gives bad results.

3rd that the maturing temperature must be higher than or equal to 80° C.

EXAMPLE 3

40.41 g of bismuth nitrate are poured into a 2-1 reactor. The volume is adjusted to 250 ml and a basic solution containing 10.88 g of ammonium metavanadate and 1.7 g of sodium silicate (solution containing 25.2 % $SiO_2$), whose volume has been made up to 450 ml by adding water, is added over 45 minutes. The remaining stages of the process are then performed as in Example 1. Finally, a light-yellow pigment powder of bismuth silicovanadate is obtained, corresponding to the formula $Bi_{1.024}Si_{0.071}V_{0.929}O_4$, the hues and the depth of color of which are comparable to those of the pigment of Example 1.

EXAMPLE 4

A bismuth vanadate pigment is prepared by following the method described in Example 1, in which 5.3 g of ammonium metavanadate are replaced with 5.54 g of sodium metavanadate. The pigment thus obtained is inferior in hue purity to the pigment of Example 1. This shows that the $NH_4$ cation, associated with the metavanadate anion, is preferable to the cations of alkali metals.

EXAMPLE 5

A bismuth molybdovanadate is prepared by following the method described in Example 1. 21.3 g of bismuth nitrate are taken. The volume is adjusted to 100 ml and a basic solution containing 2.675 g of sodium molybdate and 2.850 g of ammonium metavanadate, the volume of which has been made up to 270 ml, is added over 45 minutes. The pH is then adjusted to 7 by adding dilute caustic soda and the temperature is raised to 80° C. Despite several hours' stirring, crystalline maturing does not take place. If, however, it is wished to obtain a molybdovanadate, then, just after the precipitation, it is necessary to adjust the pH to 4.5 by adding caustic soda, to stir for one hour, to filter, wash, dry and to calcine for one hour at 600° C. The light yellow pigment thus obtained is, however, at least 50% less coloring than the pigment of Example 1.

EXAMPLE 6

A bismuth vanadate pigment in which foreign ions such as alogen, alkali or metallic ions are added either to the ammonium vanadate solution or during the during the method of stirring for maturing was prepared by following the method of Example 1. We employed as the foreign ions:

a) 2.5 g of potassium fluoride, b) 2.5 g of sodium chloride, c) 0.25 g of iron nitrate;

the pigments thus obtained have a dark hue and are not highly coloring.

EXAMPLE 7

A pigment (test 1031) is produced according to Example 4E of patent FR-2355779. Moreover, it is stabilized with aluminum pyrophosphate, relying on Example 2 of this patent, in order to make it possible to compare the fastness to light and to inclement weather.

Another pigment (test 1035) is produced according to the above-mentioned Example 1. It has been stabilized in the same way as test 1031, that is to say with aluminum pyrophosphate.

In paints made with the two pigments it can be seen that test 1031 is markedly darker, yellower and dirtier than test 1035, this being as much in full depth as in a depth toned down 1:1 with titanium white $\Delta E^*$ 11.60 (1035-1031)

$\Delta L^*$ 5.03 (darker)

$\Delta C^*$ 10.11 (dirtier)

$\Delta H^*$ 2.66 (yellower)

The above symbols are colorimetric terms referring to CIE lab values. The term $\Delta E^*$ represents a measure of the color difference between the two tests, $\Delta L^*$ represents a difference in the lightness component of the two tests, $\Delta C^*$ represents the difference in the saturation component of the two tests, and $\Delta H^*$ represents the difference of the hue component of the two tests.

In the case of yet another pigment (test 1032) the sodium vanadate ($V_2O_5$+NaOH) in the process described in the patent FR-2345779 (test 1031) is replaced with an equivalent quantity of ammonium metavanadate. If this test 1032 is now compared with test 1031, the influence of the $NH_4$ ion is noted: lighter, purer, greener $\Delta E^*$: 4.58 (1031-1032)

$\Delta L^*$: 1.84 (lighter)

$\Delta C^*$: 4.13 (purer)

$\Delta H^*$: 0.71 (greener)

However, according to this process, even with ammonium metavanadate, a pigment is obtained which is inferior to that which can be obtained with the process according to the invention: the pigment remains darker, dirtier and yellower than with the process according to the invention $\Delta E^*$: 6.49 (1035-1032)

$\Delta L^*$: 2.99 (darker)

$\Delta C^*$: 5.60 (dirtier)

$\Delta H^*$: 1.77 (yellower)

We claim:

1. A process for preparing a pigment based on bismuth vanadate, comprising the steps of:
   a) reacting an acidic solution of bismuth nitrate with a basic solution of ammonium metavanadate to form a precipitate in a very acidic reaction mixture with a pH value of between 1 and 2;
   b) bringing the pH of the reaction mixture to a value about 7;
   c) bringing the reaction mixture to a temperature of at least 80° C. for a period of about 30 minutes, while maintaining the pH at a value about 7;
   d) stirring the reaction mixture for a period of time of at least one-half hour until a pH of approximately 6.5 is reached;
   e) filtering the precipitate from the reaction mixture; and
   f) washing and drying the precipitate to obtain a dried pigment.

2. The process of claim 1, wherein the step of bringing the pH of the reaction mixture to a value includes the addition of a base to bring ring the pH of the reaction mixture directly to a steady value of approximately 7.

3. The process of claim 1, wherein the precipitate is dried at a temperature of at least 300° C.

4. The process of claim 1, further comprising the step of coating the precipitate.

5. The process of claim 1, further comprising the step of treating the precipitate.

6. A pigment based on bismuth vanadate formed from a process comprising the steps of:
   a) reacting an acidic solution of bismuth nitrate with a basic solution of ammonium metavanadate to form a precipitate in a very acidic reaction mixture with a pH value of between 1 and 2;
   b) bringing the pH of the reaction mixture to a value about 7;
   c) bringing the reaction mixture to a temperature of at least 80° C. for a period of about 30 minutes, while maintaining the pH at a value about 7;
   d) stirring the reaction mixture for a period of time of at least one-half hour until a pH of approximately 6.5 is reached;
   e) filtering the precipitate from the reaction mixture; and
   f) washing and drying the precipitate to obtain a dried pigment.

7. The pigment of claim 6, wherein the process further comprises the step of bringing the pH of the reaction mixture to a value includes the addition of a base to bring the pH of the reaction mixture directly to a steady value of approximately 7.

8. The pigment of claim 6, wherein the precipitate is dried at a temperature of at least 300° C.

9. The pigment of claim 6, wherein the process further comprises the step of coating the precipitate.

10. The pigment of claim 6, wherein the process further comprises the step of treating the precipitate.

* * * * *